US010225909B2

(12) United States Patent
Hung (10) Patent No.: US 10,225,909 B2
(45) Date of Patent: Mar. 5, 2019

(54) DETERMINING AN OPTIMIZED SPECTRAL POWER DISTRIBUTION OF A LIGHT SOURCE

(71) Applicant: Konica Minolta Laboratory U.S.A., Inc., San Mateo, CA (US)

(72) Inventor: Po-Chieh Hung, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 71 days.

(21) Appl. No.: 14/916,268

(22) PCT Filed: Sep. 12, 2014

(86) PCT No.: PCT/US2014/055501
§ 371 (c)(1),
(2) Date: Mar. 3, 2016

(87) PCT Pub. No.: WO2015/038962
PCT Pub. Date: Mar. 19, 2015

(65) Prior Publication Data
US 2016/0227626 A1    Aug. 4, 2016

Related U.S. Application Data

(60) Provisional application No. 61/877,844, filed on Sep. 13, 2013.

(51) Int. Cl.
*H05B 37/02* (2006.01)
*G01J 3/28* (2006.01)
*H05B 33/08* (2006.01)

(52) U.S. Cl.
CPC ............ *H05B 37/0227* (2013.01); *G01J 3/28* (2013.01); *H05B 33/0866* (2013.01); *G01J 2003/283* (2013.01)

(58) Field of Classification Search
CPC .. H05B 33/08; H05B 33/086; H05B 33/0866; H05B 37/02; H05B 37/0227; G01J 3/28; G01J 2003/283
See application file for complete search history.

(56) References Cited

U.S. PATENT DOCUMENTS

| 8,686,641 B2 * | 4/2014 | Maxik ............... H05B 33/0863 |
| | | 315/113 |
| 2009/0200907 A1 * | 8/2009 | Zukauskas ......... H05B 33/0866 |
| | | 313/1 |

(Continued)

FOREIGN PATENT DOCUMENTS

WO    2012/134467 A1    10/2012

OTHER PUBLICATIONS

Huaji,e Luo and Peng, Jin, "Optimization of Trichromatic Color Temperature Tunable White Light LEDs," ICEOE 2011, V3, pp. 287-290.*

(Continued)

*Primary Examiner* — Thai Pham
(74) *Attorney, Agent, or Firm* — Osha Liang LLP (57) ABSTRACT

A method for determining a custom power spectral distribution (PSD) for use in a specialized light source and a lighting system. The method includes obtaining a PSD corresponding to light that is output by the lighting system, obtaining a constraint, and determining the custom PSD by optimizing (minimizing or maximizing), subject to the constraint, an evaluation function comprising the PSD, an unwanted light function, a wanted light function, or another characteristic function.

22 Claims, 9 Drawing Sheets

(56) References Cited

U.S. PATENT DOCUMENTS

| | | | |
|---|---|---|---|
| 2009/0208462 A1* | 8/2009 | Hankins | C07K 14/705 424/93.7 |
| 2011/0137757 A1* | 6/2011 | Paolini | G06Q 30/0641 705/27.1 |
| 2014/0055038 A1* | 2/2014 | Cappitelli | H05B 33/08 315/151 |
| 2014/0077705 A1* | 3/2014 | Hung | H05B 33/0845 315/152 |

OTHER PUBLICATIONS

Written Opinion issued in corresponding Application No. PCT/US2014/055501, dated Dec. 16, 2014 (7 pages).

International Search Report issued in corresponding Application No. PCT/US2014/055501, dated Dec. 16, 2014 (2 pages).

International Preliminary Report on Patentability issued in corresponding Application No. PCT/US2014/055501, dated Mar. 24, 2016 (9 pages).

\* cited by examiner

DETERMINING AN OPTIMIZED SPECTRAL POWER DISTRIBUTION OF A LIGHT SOURCE

CROSS-REFERENCE TO RELATED APPLICATIONS

This application claims priority pursuant to Article 8 of the Patent Cooperation Treaty and 35 U.S.C. § 119(e) to U.S. Provisional Patent Application Ser. No. 61/877,844, filed on Sep. 13, 2013, the contents of which is hereby incorporated by reference in its entirety.

BACKGROUND

Energy consumption of lighting systems is a major concern in today's society. For example, governments may encourage developing more efficient light sources and smart controls for those light sources. Some methods of improving light efficiency rely on improvements of the underlying materials and structures of the lighting devices themselves. Other methods involve designing customized spectral distributions that satisfy color quality and luminous efficacy. Still other methods require designing light management systems with sophisticated sensors and algorithms to control the intensity of lights depending on ambient light, occupancy, and usage.

SUMMARY OF INVENTION

In general, in one aspect, one or more embodiments of the invention are directed to a method for determining a custom power spectral distribution (PSD). The method includes obtaining a PSD corresponding to a plurality of light sources, obtaining a constraint, and determining the custom PSD by optimizing (minimizing or maximizing), subject to the constraint, an evaluation function comprising the PSD and an unwanted light function.

In general, in one aspect, one or more embodiments of the invention are directed to a method for determining a custom PSD. The method includes obtaining a PSD corresponding to a plurality of light sources, obtaining a constraint, and determining the custom PSD by maximizing, subject to the constraint, an evaluation function comprising the PSD and an area in a chromaticity diagram or color space.

In general, in one aspect, one or more embodiments of the invention are directed to a non-transitory computer readable medium (CRM) storing instructions for determining a custom PSD. The instructions include functionality for obtaining a PSD corresponding to a plurality of light sources, obtaining a constraint, and determining the custom PSD by optimizing (minimizing or maximizing), subject to the constraint, an evaluation function comprising the PSD and an unwanted light function.

In general, in one aspect, one or more embodiments of the invention are directed to a non-transitory CRM storing instructions for determining a custom PSD. The instructions include functionality for obtaining a PSD corresponding to a plurality of light sources, obtaining a constraint, and determining the custom PSD by maximizing, subject to the constraint, an evaluation function comprising the PSD and an area in a chromaticity diagram or color space.

In general, in one aspect, one or more embodiments of the invention are directed to a lighting system that outputs light having a custom PSD. The system includes a control unit or controller, and a plurality of light sources. A combined light output by the plurality of lights sources has the custom PSD. The custom PSD is defined to be a PSD that results from optimizing (minimizing or maximizing), subject to the constraint, an evaluation function comprising an initial PSD and an unwanted light function.

In general, in one aspect, one or more embodiments of the invention are directed to a lighting system that outputs light having a custom PSD. The system includes a control unit or controller and a plurality of light sources. A combined light output by the plurality of lights sources has the custom PSD. The custom PSD is defined to be a PSD that maximizes, subject to a constraint, an evaluation function comprising an initial PSD and an area in a chromaticity diagram or color space.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention include a method for determining an optimized spectral power distribution (P SD) for a light source and a light source having an optimized spectral power distribution. As used herein, the terms optimized, extreme, and extremal are used interchangeably, and all are understood to be synonymous with the term optimized. In addition, where a particular optimization is discussed below, e.g., involving the minimization of an evaluation function g subject to a set of constraints, it is intended that this language covers both minimization of the evaluation function g and maximization of the inverse of the evaluation $g^{-1}$. For the sake of clarity, the equivalence of maximization and minimization in the above context is assumed throughout the disclosure so as not to clutter the description with unnecessary repetition. In accordance with one or more embodiments, the method may calculate optimized PSD's for use in optimal light sources for a given environment/use. For example, the method of determining the optimal PSD of a light source may be used to calculate the PSD for a light source that gives the largest color gamut, a light source that gives the lowest impact for fine arts, (i.e., one that minimizes light source induced damage of the artworks), a light source that may be used under low light conditions and help maintain a person's dark adapted vision, and a light source that is optimized for use in clean room for semiconductor manufacturing. These examples are not meant to be limiting and other light sources may be envisioned without departing from the scope of the present disclosure.

In accordance with one or more embodiments, the optimized PSD may be calculated by defining an evaluation function (also referred to herein as a cost function) and setting up correlated color temperature (CCT) on the Planckian locus and Color Rendering Index (CRI), if applicable. To determine the optimized PSD, the evaluation function is optimized using a numeric nonlinear optimization routine, e.g., the non-linear iterative Generalized Reduced Gradient (GRG2) algorithm may be used. As used herein, the scope of the term optimization encompasses at least both minimization and maximization of the evaluation function. Average color rendering index, $R_a$, is often used for CRI, but a special color rendering index such as R9-R14 may also be used for CRI. Any index, such as the Color Discrimination Index (CDI), Color Quality Scale (CQS) can be used for CRI. Additional examples of appropriate indices for use as the CRI are listed on pages 6.24-25 of "The Lighting Handbook (Tenth edition)" published by the Illuminating Engineering Society.

Figure 1:
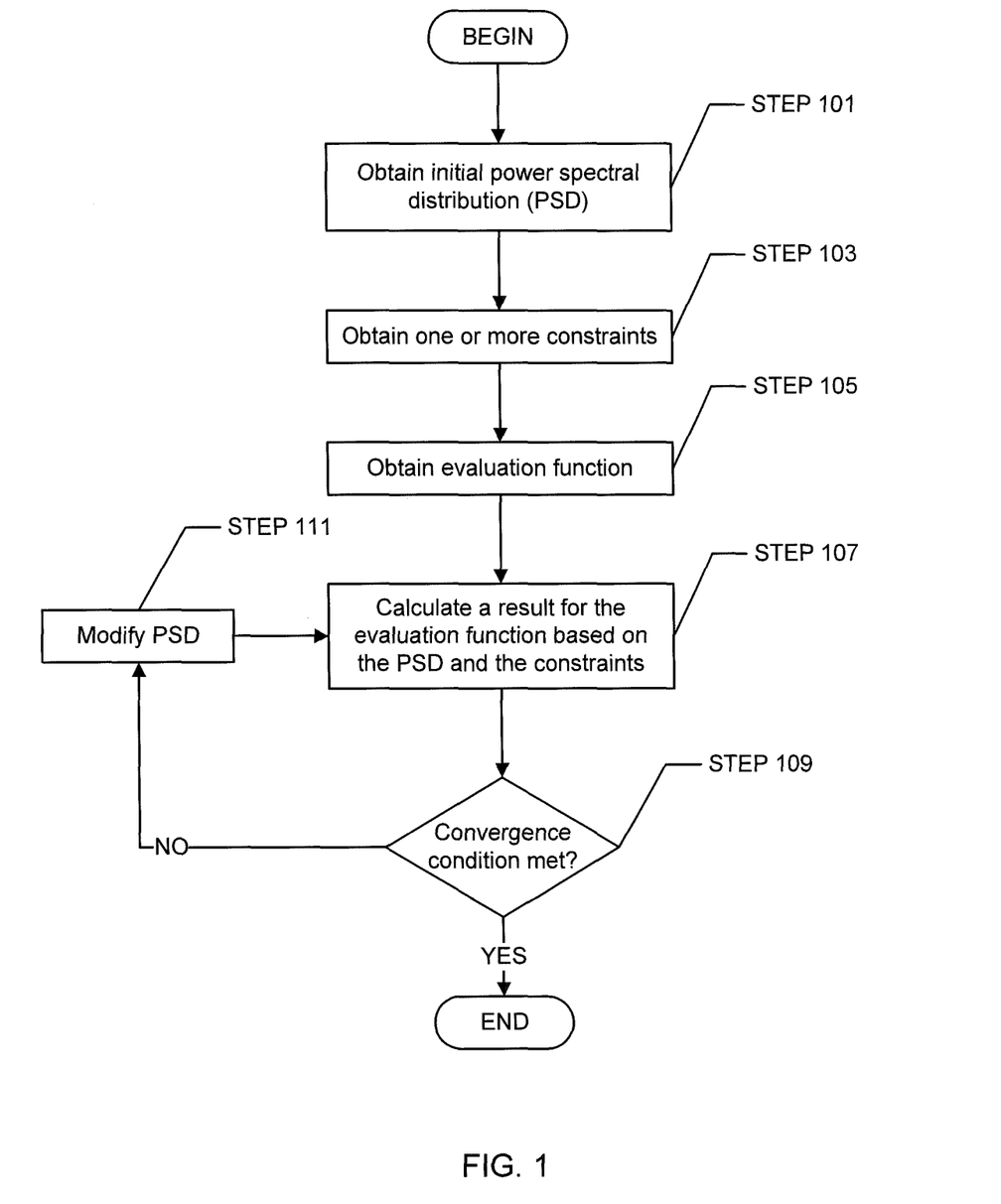
FIG. 1 shows a flowchart in accordance with one or more embodiments of the invention.

FIG. 1 shows a flow chart illustrating a method for determining an optimized PSD in accordance with one or more embodiments of the present invention.

Figure 6:
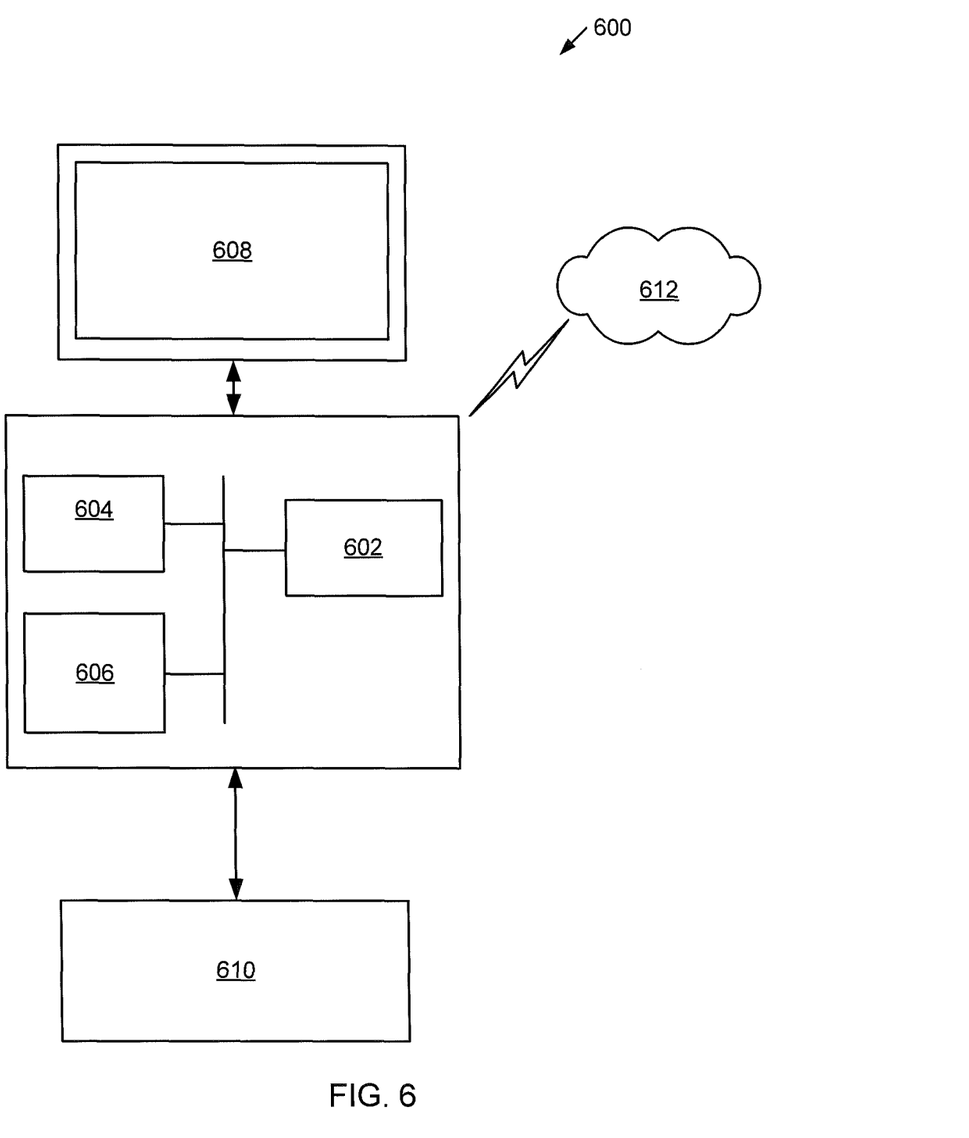
FIG. 6 shows a computer system in accordance with one or embodiments of the invention.
Figure 7:
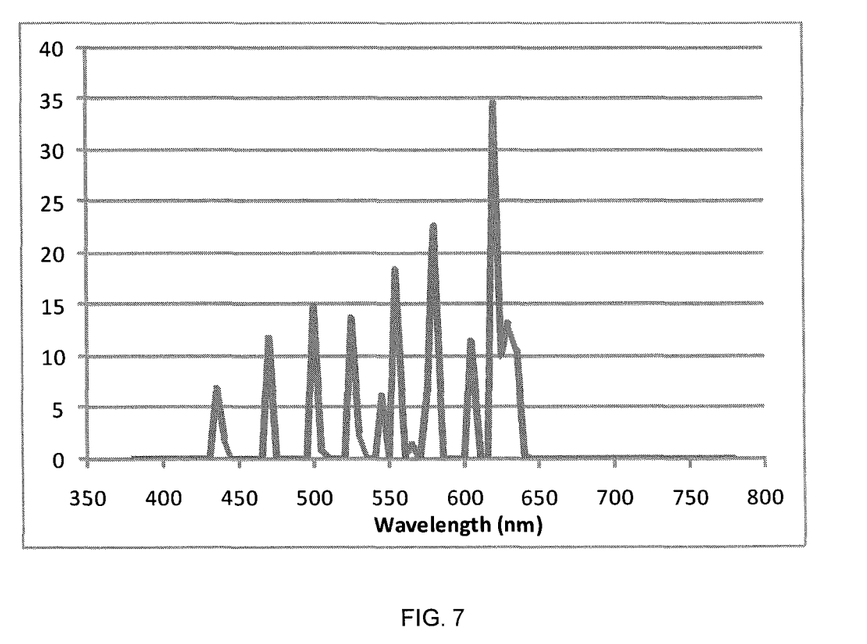
FIG. 7 shows an example of an initial PSD in accordance with one or more embodiments of the invention.
Figure 8:
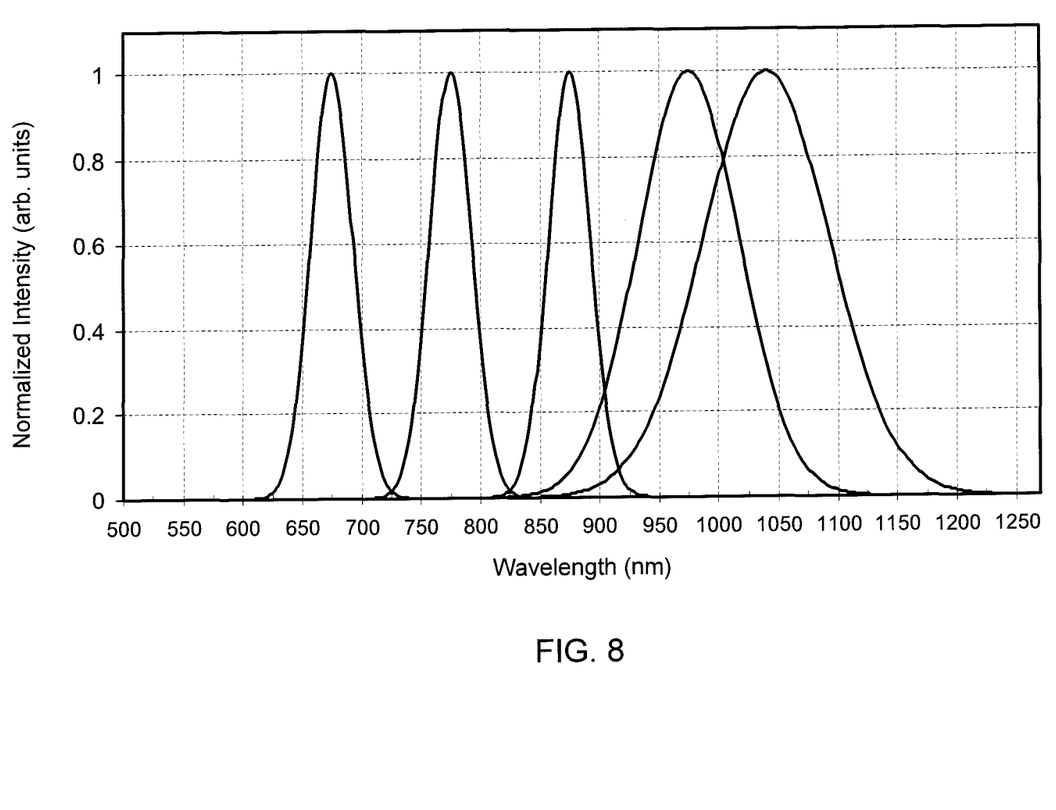
FIG. 8 shows an example of an initial PSD in accordance with one or more embodiments of the invention.

In STEP 101 an initial PSD $L(\lambda)$ is obtained. In accordance with one or more embodiments, the initial PSD may be arbitrarily defined and serves as an input to the optimization routine. Accordingly, the initial PSD may be stored in a data store, computer memory, external storage device, or the like. FIG. 6 shows one example of a computer system on which the method may run and where the initial PSD may be initially entered via input device 610 and stored in either storage device 606 or memory 604. In accordance with one or more embodiments, $L(\lambda)$ may be an approximate composite white light source comprised of a superposition of different sources. For example, $L(\lambda)$ may be defined as:

$$L(\lambda) = \sum_{i=1}^{n} w_i \cdot L_i(\lambda) \qquad (0)$$

where $w_i$ are the weight variables (non-negative) that may be adjusted during the optimization procedure and $L_i(\lambda)$ is the spectrum of each component source. Any type of composite light source may be used as $L(\lambda)$. For example, FIG. 7 shows a monochromatic spike light source having i=81 different monochromatic sources. This type of light source is based on that described in Po-Chieh Hung et al, "Maximum White Luminous Efficacy of Radiation Versus Color Rendering Index and Color Temperature: Exact Results and a Useful Analytic Expression" JOURNAL OF DISPLAY TECHNOLOGY, Vol. 9, No. 6. June 2013, pp. 405-412, incorporated by reference herein in its entirety. In accordance with one or more embodiments, an MWLER light source may be implemented by any programmable light source, e.g., programmable light sources that are currently manufactured for use in microscopy and spectroscopy imaging systems. As another example, each $L_i(\lambda)$ may be derived from a quantum dot light source. An example of a $L(\lambda)$ formed from any number of quantum dot light sources. In accordance with one or more embodiments, a quantum dot light source may be a quantum dot based LED also known as a QD-LED. In accordance with one or more embodiments, the size and geometry of the quantum dots employed may allow for beneficial spectral properties, e.g., QD-LEDs may be designed to emit light in very specific regions of the electromagnetic spectrum and may also be designed to emit light having a Gaussian spectral distribution. In accordance with one or more embodiments, quantum dots of various sizes with smaller dots emitting bluer (higher energy) radiation and larger dots emitting redder radiation (lower energy). For example, quantum dots may be made from nanocrystals of a semiconductor material synthesized with a shell of another material (e.g., CdSe quantum dots with CdS shells, with size ranges from 5-50 nm). One example of a $L(\lambda)$ from a QD-LED based light source is shown in FIG. 8. Quantum dots may be formed by many different ways and thus, the embodiments of the present invention are not limited to a particular type of quantum dot technology.

Another example of $L(\lambda)$ may be formed from a number of different spectra that are generated by a combined LED light source. One such light source, dubbed the Spectrally Tunable Lighting Source (STLS), includes i=22 different sub-spectra and has been recently developed by the National Institutes of Standards and Technology (NIST). See http://www.nist.gov/pml/div685/grp03/vision_lighting.cfm. Such a spectrally tunable LED light source may include several high-power LED's (in some cases over one thousand) that each may each be computer controlled to allow for the optical properties of light source to be controlled, e.g., the chromaticity of illumination may be precisely controlled.

In another example, in accordance with one or more embodiments, the initial power spectral density may be a flat topped distribution over the wavelength range of interest. In the examples disclosed herein, a constant, non-negative initial PSD having a 5-nm increment is used in a range of 380-780 nm.

The above discussion is provided merely for the sake of example and thus the embodiments of the present invention are not limited by a particular type of $L(\lambda)$ that is embodied by any particular type of light source described above. Rather, any type of light source may be used without departing from the scope of the present disclosure.

In STEP 103, the constraint values for use in the optimization problem are obtained. As with the initial PSD, for embodiments that are implemented on the computer system of FIG. 6, the constraint values may have been previously stored in computer memory 604 and/or storage device 606. In accordance with one or more embodiments, a number of different constraint values may be used, e.g., values of CCT, $D_{uv}$, and/or $R_a$ may be used without departing from the scope of the present disclosure.

In STEP 105, an evaluation function is obtained. Again, in accordance with one or more computer implemented embodiments, as shown in FIG. 6, the evaluation function may be predetermined and stored in computer memory 604 and/or storage device 606. In accordance with one or more embodiments, the evaluation function is the function to be optimized in order to determine the optimal power spectral density. As used herein the term "function" is used broadly to include functions and functionals, whether expressed in a closed form or not. In accordance with one or more embodiments, the evaluation function is based on the initial power spectral distribution and at least one other function that is related to the type of light source desired (e.g., museum light, clean room light, etc.). For example, in accordance with one or more embodiments, the evaluation function may be a function that is to be maximized, as is the case for determining a maximum color gamut PSD, as described in more detail below in reference to FIGS. 2(A)-2(B). Likewise, the evaluation function may be a function that is minimized. For example, the evaluation functions described below in reference to FIGS. 3-5 are functions that are to be minimized. In accordance with one or more embodiments, an evaluation function may be a combination of an unwanted light function and a wanted light function. In this case, the optimization produces an optimized PSD that maximizes the wanted light while minimizing the unwanted light subject to the set of constraints as described in more detail below, e.g., the constraints of CCT, $D_{uv}$, $R_a$, or the like.

In STEP 107, a result for the evaluation function is calculated based on the initial PSD and the constraints. In accordance with one or more computer implemented embodiments, as shown in FIG. 6, the evaluation function may be calculated by computer processor 602 and, for each iteration, the calculated value may be stored in computer memory 604 and/or storage device 606.

In STEP 109, the calculated result is tested against a convergence condition to determine whether or not the optimization routine has converged, i.e., that the evaluation function has been maximized or minimized. For example, the result may be compared to a previous iteration and if the difference between the two values is greater than a threshold, the PSD is adjusted at STEP 111 and the method returns to STEP 107.

If the convergence condition is met in STEP 109, the method ends and the PSD may be output as the optimized PSD or stored for later use. Those skilled in the art, having the benefit of this detailed description, will appreciate that STEPS 105, 107, 109, and 111 correspond to determining the optimized PSD (also referred to as a custom PSD) using the evaluation function and subject to the constraint(s).

Figure 2A:
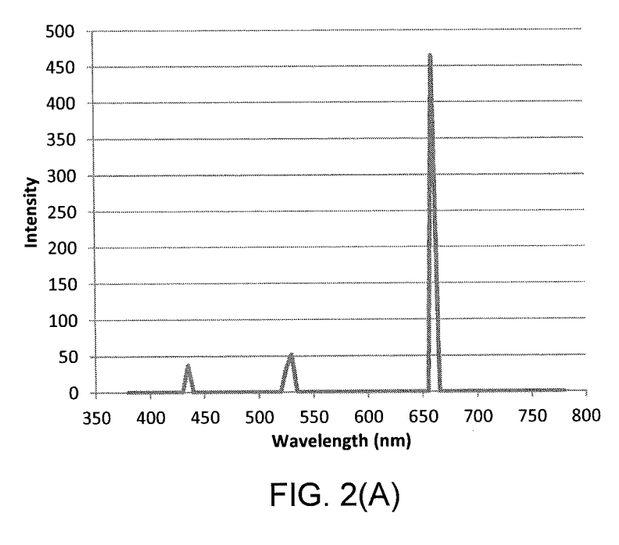
FIG. 2(A) shows an optimal PSD in accordance with one or more embodiments of the invention.
Figure 2B:
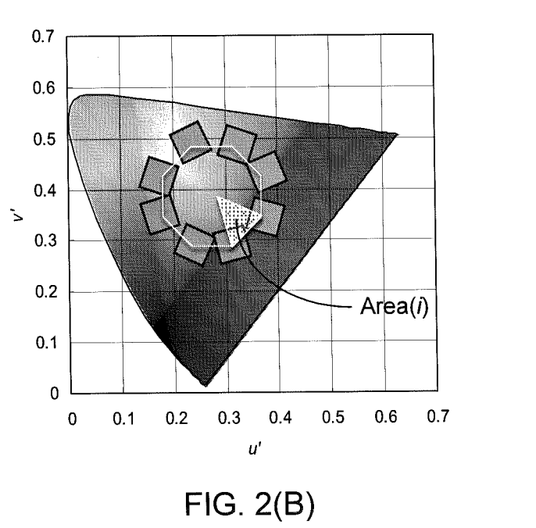
FIG. 2(B) shows an example evaluation function in accordance with one or more embodiments of the invention.

FIGS. 2(A)-(B) show an example evaluation function and custom PSD for "Maximum Color Gamut Light" in accordance with one or more embodiments of the invention. In such embodiments, an optimized PSD may be found that provides the largest color gamut. This type of light is referred to herein as maximum color gamut (MGA) light. In accordance with one or more embodiments, MGA light is light that boosts the color saturation of objects as much as possible. In accordance with one or more embodiments, the PSD of an MGA light source is one that maximizes the saturation, or the area of the octagon formed by the eight color patches defined in CIE 13.3 in the u'v' chromaticity diagram, as shown in FIG. 2(B). In accordance with one or more embodiments, the area is calculated by the sum of triangles formed by two adjacent color patches and the barycenter of the eight color patches. The example shown in FIG. 2(B) is for a CCT of 3999K. FIG. 2(A) shows the optimized PSD for an MGA light source, i.e., this three spiked distribution is the one which maximizes the evaluation function defined by the area of the octagon formed by the eight color patches defined in CIE 13.3 in the u'v' chromaticity diagram shown in FIG. 2(B), subject to a CCT constraint and a $D_{uv}$ constraint.

Without departing from the scope of the present disclosure, instead of the u'v' chromaticity diagram, the xy chromaticity diagram, the uv chromaticity diagram, and/or 3-dimensional color space such as CIELAB, CIELUV, CIECAM02 may also be used. Furthermore, $D_{uv}$ can be non-zero, i.e., the chromaticity of the light will not be on the Planckian locus. Instead of the Planckian locus, Daylight locus can be used at 5000K or more. This means that a slightly greenish color will be chosen for targeted chromaticity. Inversely, for low color temperature, slightly pinkish color may be chosen for psychologically pleasing white.

In other words, the optimized PSD in this example is found to be the PSD that solves the following optimization problem:

$$\max\left[\sum_{i=1}^{8} \text{Area}(i)\right] \quad (1)$$

subject to (s.t.)

$$\text{CCT} = C_1 \quad (2)$$

$$D_{uv} = D_1 \quad (3)$$

In the example shown in FIG. 2(A), $C_1 = 3999$ K and $D_1 = 0$, and Area(i) is the area of the $i^{th}$ triangle formed by two adjacent color patches and the barycenter of the eight color patches.

Figure 3A:
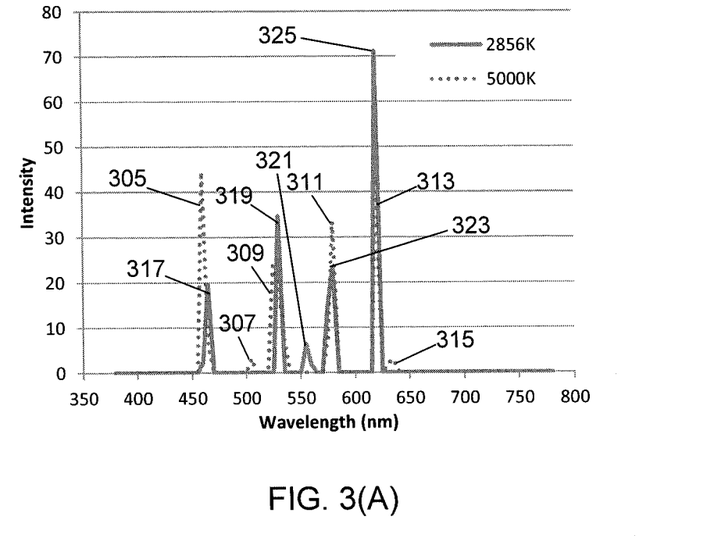
FIG. 3(A) shows an optimal PSD in accordance with one or more embodiments of the invention.
Figure 3B:
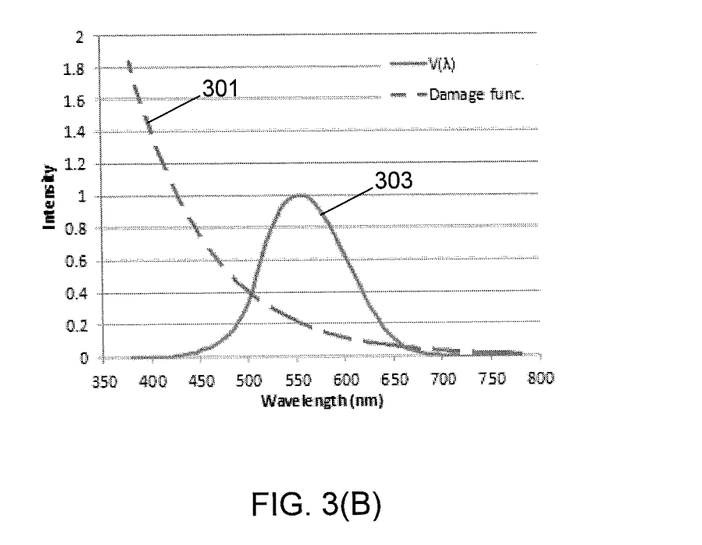
FIG. 3(B) shows an example evaluation function in accordance with one or more embodiments of the invention.

FIGS. 3(A)-3(B) show an example evaluation function and custom PSD for a light source having the lowest impact to fine arts, e.g., museum light, in accordance with one or more embodiments. CIE 157 defines damage functions with respect to wavelength for fine arts, which have more weight in the UV region. For example, the damage function damage ($\lambda$) is defined to be:

$$\text{damage}(\lambda) = e^{-b(\lambda - 300)} \quad (4)$$

where b is a material dependent constant called the matter constant. Examples of commonly encountered matter constants are 0.0380 for low-grade paper, 0.0125 for rag paper, 0.0115 for oil on canvas, 0.0100 for textiles, 0.0115 for water color on rag paper. In accordance with one or more embodiments, to minimize the impact for the fine arts, an evaluation function in the form of a cost function is obtained that depends on a combination of the damage function damage($\lambda$), also referred to herein as the unwanted light function and the PSD L($\lambda$), normalized by a combination of the PSD L($\lambda$) and the wanted light function V($\lambda$). In accordance with one or more embodiments, V($\lambda$) may be the functional representation of a particular response of the eye, e.g., the photopic response function of the human eye.

FIG. 3(B) shows an example of a damage function 301 referred to herein as damage($\lambda$) shown as the dashed line in the plot, and a wanted light function 303, referred to herein as V($\lambda$), shown as the solid line, to be used in a method for determining the optimized PSD for museum light in accordance with one or more embodiments. In this example, the cost function may be written as:

$$\text{cost} = \left[ \frac{\int L(\lambda) \cdot \text{damage}(\lambda) d\lambda}{\int L(\lambda) V(\lambda) d\lambda} \right] \quad (5)$$

Accordingly, the optimized PSD may be found by minimizing the cost function subject to a set of constraints, or equivalently maximizing the inverse of the cost function $\text{cost}^{-1}$. For example, FIG. 3(A) shows examples of two optimized PSD's calculated using the cost function (5) subject to constraints on CCT, $D_{uv}$, and $R_a$. In other words, the optimized PSD for museum light may be found by solving the following optimization problem:

$$\min \left[ \frac{\int L(\lambda) \cdot \text{damage}(\lambda) d\lambda}{\int L(\lambda) V(\lambda) d\lambda} \right] \quad (6)$$

s.t.

$$CCT = C_2$$

$$D_{uv} = D_2$$

$$R_a = R_2$$

The results of this optimization are shown in FIG. 3(A) where Duv=0, Ra=95, and CCT=5000K for the PSD shown as a dotted line and CCT=2856 K for the PSD shown as the solid line. As can be seen in FIG. 3(A), the optimized PSD for CCT=5000K is composed of six relatively narrow bandwidth spectral components 305, 307, 309, 311, 313, and 315 at approximately 460 nm, 510 nm, 525 nm, 580 nm, 620 nm and 635 nm, respectively. The relative intensities of spectral components 305, 307, 309, 311, 313, and 315 are approximately 45, 3, 24, 34, 42, and 3, respectively. As also can be seen in FIG. 3(A), the optimized PSD for CCT=2856K is composed of five relatively narrow bandwidth spectral components 317, 319, 321, 323, and 325 at approximately 465 nm, 515 nm, 556 nm, 580 nm, and 620 nm, respectively. The relative intensities of spectral components 317, 319, 321, 323, and 325 are approximately 20, 35, 6, 24, and 71, respectively. The embodiments of the invention disclosed herein need not be limited by these precise values and as such, the approximate values are provided herein merely for the sake of example.

Figure 4A:
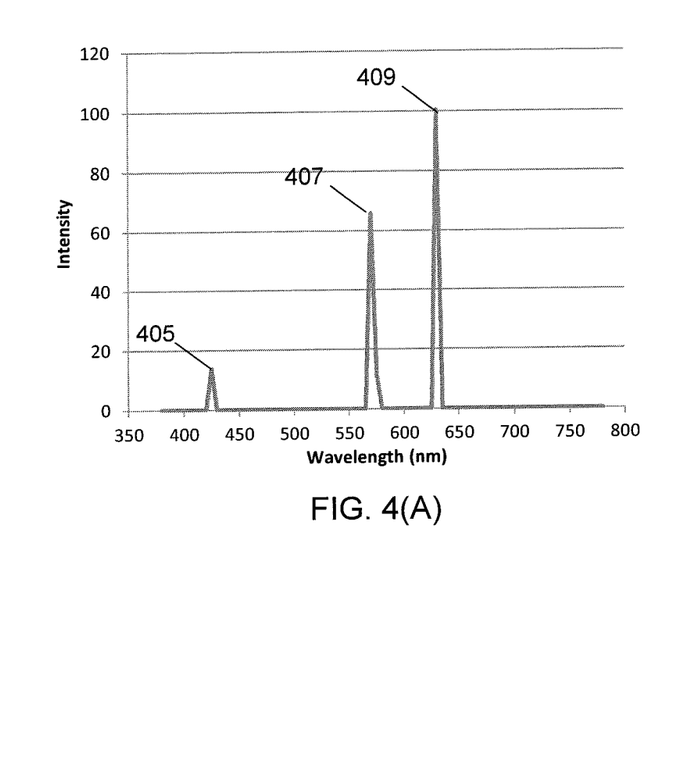
FIG. 4(A) shows an optimal PSD in accordance with one or more embodiments of the invention.
Figure 4B:
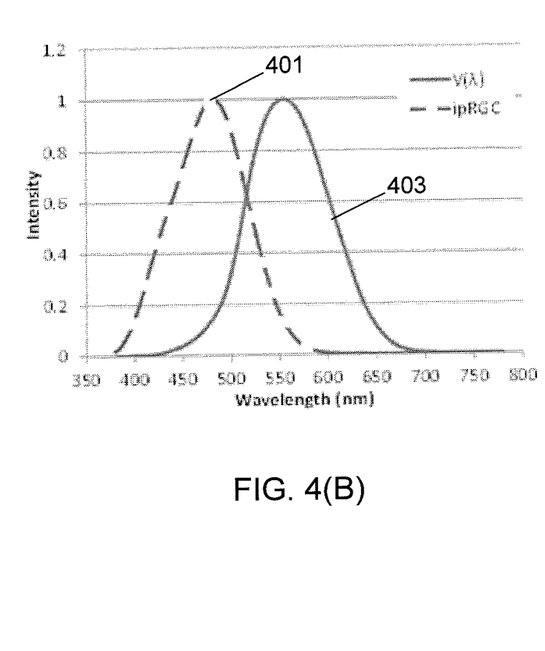
FIG. 4(B) shows an example evaluation function in accordance with one or more embodiments of the invention.

FIGS. 4(A)-4(B) show an example evaluation function and custom PSD for a light source having the lowest impact to pupil, e.g., dark adaptation light, in accordance with one or more embodiments. Regulation of pupil size is controlled, in part, by intrinsically photosensitive Retinal Ganglion Cells (ipRGC), the response of which has a peak at about 480 nm. At night, red light is often used in crew cabins of vessels to keep dark adaptation of eye, e.g., to maintain a large size of the pupil for dark viewing. For example, crews of ships often need to view charts for navigation and also need to see outside to watch other vessels and/or obstacles. Often, red light may be used because it does not have short enough wavelength to significantly stimulate the ipRGC. However, such light is often monochromatic and thus, does not provide for comfortable viewing. In accordance with one or more embodiments, the method disclosed herein may determine an optimized PSD that minimally stimulates ipRGC while at the same time appears less monochromatic than traditional red sources.

In accordance with one or more embodiments, the sensitivity function 401 of ipRGC may be used in the evaluation function, as shown by the dashed line of FIG. 4(B). For example, a spectral sensitivity which has a peak of about 480 nm and a full width at half maximum of about 100 nm. Thus, in this example, the sensitivity function of ipRGC serves as the unwanted light function. The wanted light function 403 on this example is again the photopic response of the eye, as described above in reference to FIG. 3(B). Accordingly, in this example the optimization problem for obtaining the optimized PSD for dark adaptation light is:

$$\min \left[ \frac{\int L(\lambda) \cdot ipRGC(\lambda) d\lambda}{\int L(\lambda) V(\lambda) d\lambda} \right] \quad (7)$$

s.t.

$$CCT = C_3$$

$$D_{uv} = D_3$$

$$R_a = R_3$$

FIG. 4(A) shows the optimized PSD obtained by solving the above optimization problem with CCT=2000 K, $D_{uv}$=0, and $R_a$=50. As also can be seen in FIG. 4(A), the optimized PSD is composed of three relatively narrow bandwidth spectral components 405, 407, and 409 at approximately 425 nm, 570 nm, and 630 nm, respectively. The relative intensities of spectral components 405, 407, and 409 are approximately 18, 65, and 100, respectively. The embodiments of the invention disclosed herein need not be limited by these precise values and as such, the approximate values are provided herein merely for the sake of example.

Figure 5A:
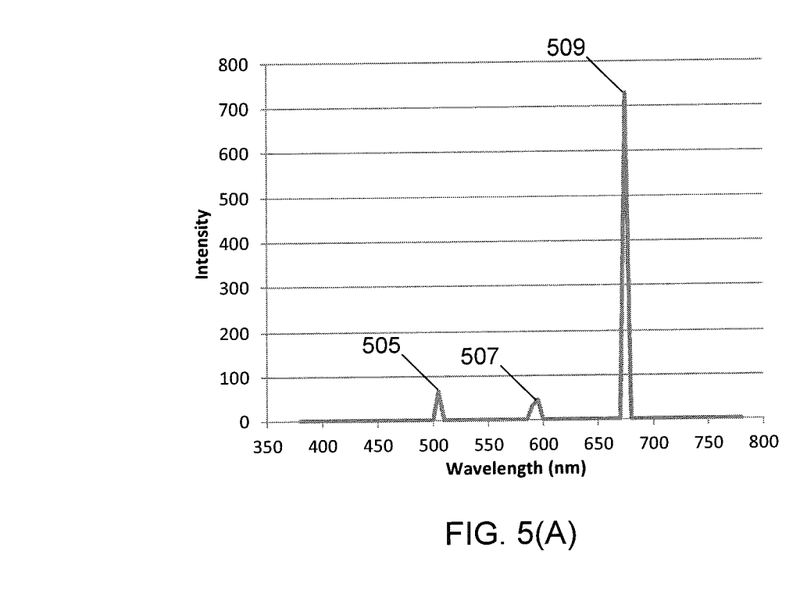
FIG. 5(A) shows an optimal PSD in accordance with one or more embodiments of the invention.
Figure 5B:
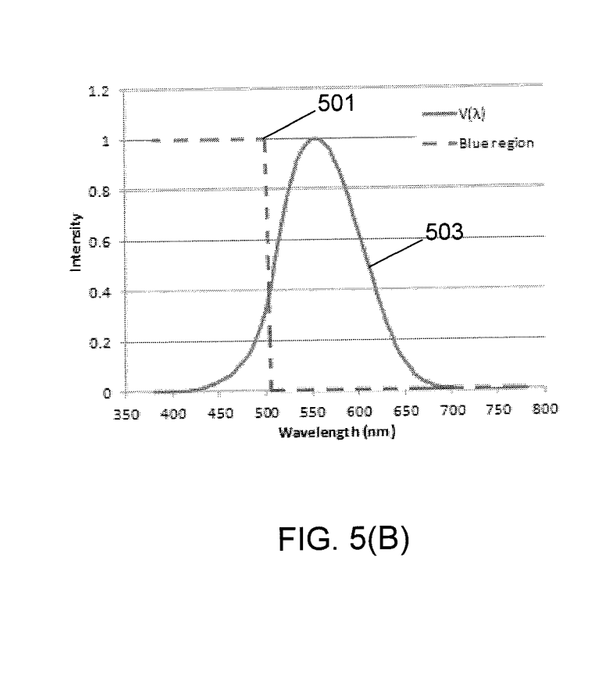
FIG. 5(B) shows an example evaluation function in accordance with one or more embodiments of the invention.

FIGS. 5(A)-5(B) show an example evaluation function and custom PSD for a clean room light source, in accordance with one or more embodiments. In clean rooms for semiconductor manufacturing, yellow light is desired without the blue region. A common solution is to put a yellow filter on the top of fluorescent tubes. However, the resulting light will be nearly monochromatic and does not provide for comfortable viewing for workers. In accordance with one or more embodiments, in the method of determining optimal clean room light, an unwanted light function 501 is used that disfavors light having a wavelength shorter than a threshold wavelength, e.g., 500 nm. For example, a step function may be used as the unwanted light function, wherein the step, or threshold, is set at 500 nm, as is shown by the dashed line in FIG. 5(B). As used herein, this unwanted light function is defined as blue_region($\lambda$). The wanted light function 403 on this example is again the photopic response of the eye, as described above in reference to FIG. 3(B). Thus the optimal PSD for clean room light may be found by solving the optimization problem:

$$\min \left[ \frac{\int L(\lambda) \cdot \text{blue\_region}(\lambda) d\lambda}{\int L(\lambda) V(\lambda) d\lambda} \right] \quad (8)$$

s.t.

$$CCT = C_4$$

-continued $$D_{uv} = D_4$$

$$R_a = R_4$$

FIG. 5(A) shows the optimized PSD for clean room light obtained by solving the above optimization problem with CCT=2000 K, $D_{uv}$=0, and $R_a$=50. As also can be seen in FIG. 4(A), the optimized PSD is composed of three relatively narrow bandwidth spectral components 505, 507, and 509 at approximately 505 nm, 590 nm, and 675 nm, respectively. The relative intensities of spectral components 405, 407, and 409 are approximately 70, 50, and 725, respectively. The embodiments of the invention disclosed herein need not be limited by these precise values and as such, the approximate values are provided herein merely for the sake of example.

FIG. 6 shows a light source PSD optimization system 600 in accordance with one or more embodiments of the invention. The system includes a PSD computation module 602 (that itself may include one or more processors, such as a central processing unit (CPU), integrated circuit, ASIC, programmable logic device, FPGA, or the like, and associated memory), memory module 604 (e.g., random access memory (RAM), cache memory, flash memory, etc.), a storage device 606 (e.g., any non-transitory computer readable medium such as a hard disk drive, solid state drive, an optical drive such as a compact disk drive or digital video disk (DVD) drive, a flash memory stick, etc.). The light source PSD optimization system 600 may also include an input device, such as a keyboard 608 and a mouse 610. Further, the light source PSD optimization system 600 may include output means, such as a monitor 612 (e.g., a liquid crystal display (LCD), a plasma display, or cathode ray tube (CRT) monitor). In accordance with one or more embodiments, the monitor 612 may also serve as an input device, e.g., a touch screen, or the like.

In accordance with one or more embodiments, the method for optimizing a PSD discussed above in reference to FIGS. 1-5 may be implemented by the light source PSD optimization system 600. In accordance with one or more embodiments, the constraints for the optimization may be predetermined and stored on the storage device 606. For example, the storage device may store CCT, $D_{uv}$, and $R_a$ values. In addition, the storage device may store all the relevant parameters necessary to compute the optimized PSD for a given application. For example the storage device 606 may store one or more wanted light functions, e.g., the photopic response of the eye V($\lambda$). In addition, one or more unwanted light functions and relevant parameters may also be stored in the storage device 606, e.g., the fine art damage function damage($\lambda$) along with at least one matter constant b, as described above.

Figure 9A:
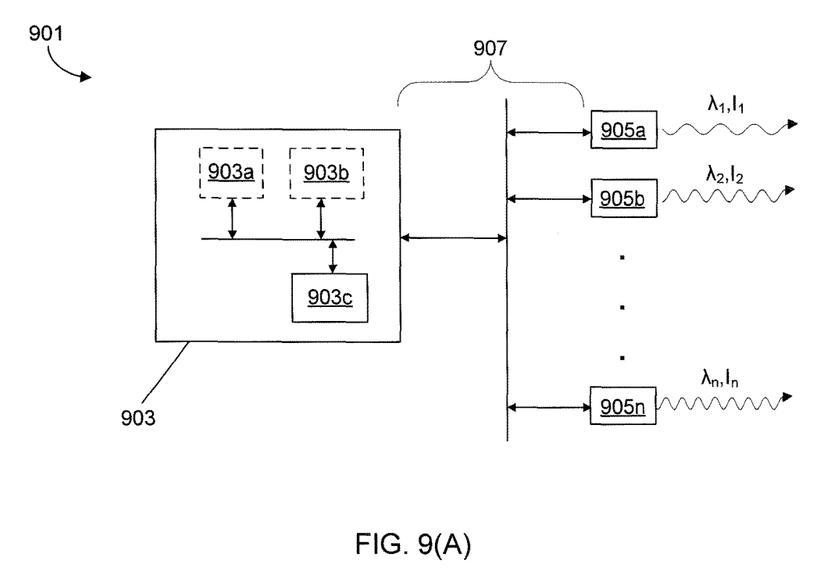
FIG. 9(A) shows a lighting system in accordance with one or more embodiments of the invention.
Figure 9B:
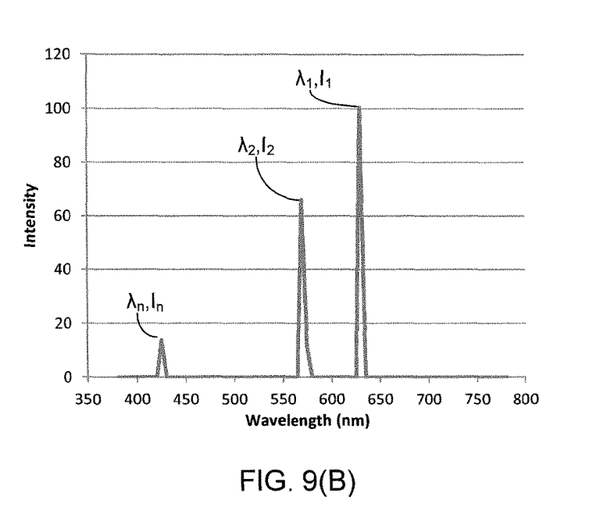
FIG. 9(B) shows an example of a PSD of combined light that is output by a lighting system in accordance with one or more embodiments of the invention.

In accordance with one or more embodiments, the storage device 606 may also include a database of candidate light source spectra that may be used to construct the initial PSD, which itself may also be stored for late use in the optimization routine. For example, the spectra shown in FIGS. 7, 8, and 9 show examples of a Maximum White Luminous Efficacy of Radiation (MLER) light source, quantum dot light sources, and LED light sources, respectively. One of ordinary skill having the benefit of this disclosure will appreciate that the initial PSD may be constructed in a completely arbitrary manner with any combination of known or hypothetical light sources without departing from the scope of the present disclosure.

In accordance with one or more embodiments, the PSD computation module 602 is operably coupled to the storage device and memory module 604 and is programmed to compute an optimized PSD based on the data stored in the storage device 606. For example, the PSD computation module 602 may compute the value of an evaluation function and then solve the related optimization problem using a numeric nonlinear optimization routine, e.g., the non-linear iterative Generalized Reduced Gradient (GRG2) algorithm may be used.

Further, in one or more embodiments of the invention, one or more elements of the aforementioned light source PSD optimization system 600 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a solid state memory device, a tape, memory, or any other non-transitory tangible computer readable storage device.

Furthermore, in accordance with one or more embodiments of the invention the light source PSD optimization system 600 may be connected to or integrated within a larger system for design and manufacture of optimized PSD light sources. Accordingly, in such a system, the data associated with the optimized PSD that is computed by the light source PSD optimization system 600 may be communicated to the relevant manufacturing equipment to ensure that the light source that is manufactured is specified by the optimized PSD. For example the manufacturing system may construct an optimized PSD light source that has any number of individual light emitting elements, the wavelength and output intensity of which is set based on the optimized PSD.

FIG. 9(A) shows an example of a lighting system 901 that employs an optimized PSD in accordance with one or more embodiments of the invention. As described below, such a system may be implemented as a programmable light source, also referred to in the art as a "light replicator." The lighting system includes a controller 903 operatively connected to lighting elements 905a, 905b, . . . , 905n. In accordance with one or more embodiments, the controller 903 includes a power supply 903c for providing one or more voltages and/or currents (i.e., one or more electrical powers) to the lighting elements 905a, 905b, . . . , and 905n. Optionally, the controller 903 further includes a processor 903a and a memory 903b. In accordance with one or more embodiments, the memory may store information related to an optimized PSD. For example, an optimized PSD may be obtained in accordance with the process shown in FIG. 1 above. The result of the optimized PSD is, in part, a listing of optimal wavelength and powers for generating the optimum light for the desired usage.

For example, for a lighting system 901 having an optimized PSD for use in dark viewing environments, e.g., like that described above in reference to FIGS. 4(A)-4(B), the optimized PSD may include three center wavelengths, $\lambda_1$, $\lambda_2$, $\lambda k_n$ and three intensities, $I_1$, $I_2$, and $I_3$, each intensity corresponding to an intensity of a relatively narrow-band (e.g., approximately 10 nm bandwidth) light source having an emission spectrum that is centered at a corresponding center wavelength. In this example, the lighting system 901 will include at least three light sources having center wavelengths of $\lambda_1=630$ nm, $\lambda_2=575$ nm, $\lambda_n=425$ nm having relative intensities of $I_1=100$, $I_2=65$, and $I_3=15$, respectively. FIG. 9(B) shows one example of the PSD of light output by the lighting system in accordance with one or more embodiments of the invention.

Thus, in accordance with one or more embodiments, to produce output light having the optimized PSD, the controller 903 outputs, via interconnect 907, one or more signals (voltage and/or current) to the light sources 905a, 905b, and 905n so that these light sources produce 630 nm light at a relative intensity of 100, 575 nm light at a relative intensity of 65, and 425 nm light at a relative intensity of 15. In accordance with one or more embodiments, the optimized PSD may be stored in memory 903b and may be used by processor 903a for causing the power supply 903c to output the necessary control signals. In other embodiments, the circuitry necessary to generate the required signals for outputting light having the optimized PSD is hard-wired into the controller based on the type of light sources used.

The above lighting system 901 is described herein as but one example of many for implementing the optimized PSD light source in accordance with one or more embodiments. While three lights sources 905a, 905b, and 905n are shown in the embodiment described above, any number and type of light source may be used without departing from the scope of the present disclosure. Furthermore, each light source 905a, 905b, . . . , 905n may be itself comprised of one light emitting element or an array of light emitting elements and each of the light emitting elements may output one or more spectral peaks of the PSD. Furthermore, the light source 905a, 905b, . . . , 905n may be designed to directly emit light having a certain wavelength and/or may be more broad band sources that emit light into one or more fixed or programmable spectral filters (not shown) to produce the particular light required for the optimized PSD. In accordance with one or more embodiments, the light sources 905a, 905b, . . . , 905n are chosen to output combined light that has a PSD that is as close as possible to the PSD obtained by minimizing or maximizing, subject to a set of constraints, an evaluation function based on an unwanted light function and/or a wanted light function, as described above in reference to FIGS. 1-5.

For example, the constraints may result in a combined light output by light sources 905a, 905b, . . . , 905n having a given CCT, Duv, and/or Ra. For example, if the lighting system 901 employs an optimized PSD like that shown in FIG. 3(B), then Duv=0, Ra=95 and CCT=5000K.

Furthermore, in accordance with one or more embodiments, and as described above in reference to FIGS. 1-5, the PSD of the combined light that is output by light sources 905a, 905b, . . . , 905n is a PSD that maximizes an evaluation function designed for a given use for the light, e.g., museum light, clean room light, etc. For example, in accordance with one or more embodiments, the PSD of the combined light that is output by light sources 905a, 905b, . . . , 905n may maximize an evaluation function designed to produce a maximum color gamut PSD, as described in more detail above in reference to FIGS. 2(A)-2(B).

Likewise, in accordance with one or more embodiments, the PSD of the combined light that is output by light sources 905a, 905b, . . . , 905n is a PSD that may minimize an evaluation function. For example, the evaluation functions described below in reference to FIGS. 3-5 are functions that are minimized. In accordance with one or more embodiments, the PSD of the combined light that is output by light sources 905a, 905b, . . . , 905n is a PSD that may be a compromise between unwanted light (e.g., light that causes damage to the objects that are illuminated) function and a wanted light (e.g., light that eases viewability for the viewer). In other words, the PSD of the combined light that is output by light sources 905a, 905b, . . . , 905n is a PSD that is an optimized PSD that maximizes the wanted light while minimizing the unwanted light subject to the set of constraints as described in more detail above, e.g., the constraints of CCT, Duv, Ra, or the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a custom power spectral distribution (PSD) of a lighting system that comprises a plurality of light sources, the method comprising:
   obtaining from a computer memory:
      a PSD corresponding to light outputted from the plurality of light sources; and
      a constraint value for use in an evaluation function to determine the custom PSD, wherein the evaluation function comprises the PSD and an unwanted light function that determines an unwanted light among the light outputted from the lighting system;
   determining, by a processor operably connected to the computer memory, the custom PSD by adjusting, subject to the constraint value, the evaluation function to minimize or maximize the evaluation function; and
   adjusting an output of the plurality of light sources based on the custom PSD.

2. The method of claim 1, wherein the unwanted light function is a damage function.

3. The method of claim 1, wherein the unwanted light function is an intrinsically photosensitive Retinal Ganglion Cells (ipRGC) response function, wherein the ipRGC is a sensitivity function of pupil size with respect to a wavelength of the plurality of light sources.

4. The method of claim 1, wherein the unwanted light function includes a wavelength threshold condition.

5. The method of claim 1, wherein the constraint value is at least one selected from a group consisting of correlated color temperature (CCT), distance from Planckian locus ($D_{uv}$), and color rendering index (Ra).

6. A method for determining a custom power spectral distribution (PSD) of a lighting system that comprises a plurality of light sources, the method comprising:
   obtaining from a computer memory:
      a PSD corresponding to light outputted from the plurality of light sources; and
      a constraint value for use in an evaluation function to determine the custom PSD,
         wherein the evaluation function that comprises the PSD, and an area in a chromaticity diagram or color space;
   determining, by a processor operably connected the computer memory, the custom PSD by maximizing, subject to the constraint value, the evaluation function; and
   adjusting an output of the plurality of light sources based on the custom PSD.

7. The method of claim 6, wherein the constraint value is at least one selected from a group consisting of correlated color temperature (CCT), distance from Planckian locus ($D_{uv}$), and color rendering index (Ra).

8. A non-transitory computer readable medium (CRM) storing instructions for determining a custom power spectral distribution (PSD) of a lighting system that comprises a plurality of light sources, the instructions when executed causing a processor to:
    obtain a PSD corresponding to light outputted from the plurality of light sources;
    obtain a constraint value for use in an evaluation function to determine the custom PSD, wherein the evaluation function comprises the PSD and an unwanted light function that determines an unwanted light among the light outputted from the lighting system;
    determine the custom PSD by solving, subject to the constraint value, the evaluation function to minimize or maximize the evaluation function; and
    adjust an output of the plurality of light sources based on the custom PSD.

9. The non-transitory CRM of claim 8, wherein the unwanted light function is a damage function.

10. The non-transitory CRM of claim 8, wherein the unwanted light function is an intrinsically photosensitive Retinal Ganglion Cells (ipRGC) response function, wherein the ipRGC is a sensitivity function of pupil size with respect to a wavelength of the plurality of light sources.

11. The non-transitory CRM of claim 8, wherein the unwanted light function includes a wavelength threshold condition.

12. The non-transitory CRM of claim 8, wherein the constraint value is at least one selected from a group consisting of correlated color temperature (CCT), distance from Planckian locus ($D_{uv}$), and color rendering index (Ra).

13. A non-transitory computer readable medium (CRM) storing instructions for determining a custom power spectral distribution (PSD) of a lighting system that comprises a plurality of light sources, the instructions when executed causing a processor to:
    obtain a PSD corresponding to light outputted from the plurality of light sources;
    obtain a constraint value for use in an evaluation function to determine the custom PSD, wherein the evaluation function that comprises the PSD, and an area in a chromaticity diagram or color space;
    determine the custom PSD by maximizing, subject to the constraint value, the evaluation function; and
    adjust an output the plurality of the light sources based on the custom PSD.

14. The method of claim 13, wherein the constraint value is at least one selected from a group consisting of correlated color temperature (CCT), distance from Planckian locus ($D_{uv}$), and color rendering index (Ra).

15. A lighting system that outputs light having a custom power spectral distribution (PSD), the system comprising:
    a processor; and
    a plurality of light sources,
    wherein the processor:
    obtains a PSD corresponding to light outputted from the plurality of light sources;
    obtains a constraint value for use in an evaluation function to determine the custom PSD, wherein the evaluation function comprises the PSD and an unwanted light function that determines an unwanted light among the light outputted from the lighting system;
    determines the custom PSD by solving, subject to the constraint value, the evaluation function to minimize or maximize the evaluation function; and
    adjusts an output of the plurality of light sources based on the custom PSD.

16. The system of claim 15, wherein the unwanted light function is a damage function.

17. The system of claim 15, wherein the unwanted light function is an intrinsically photosensitive Retinal Ganglion Cells (ipRGC) response function, wherein the ipRGC is a sensitivity function of pupil size with respect to a wavelength of the plurality of light sources.

18. The system of claim 15, wherein the unwanted light function includes a wavelength threshold condition.

19. The system of claim 15, wherein the constraint value is at least one selected from a group consisting of correlated color temperature (CCT), distance from Planckian locus ($D_{uv}$), and color rendering index (Ra).

20. The system of claim 15, wherein the evaluation function further includes a wanted light function.

21. A lighting system that outputs light having a custom power spectral distribution (PSD), the system comprising:
    a processor; and
    a plurality of light sources,
    wherein the processor:
    obtains a PSD corresponding to light outputted from the plurality of light sources;
    obtain a constraint value for use in an evaluation function to determine the custom PSD, wherein the evaluation function that comprises the PSD, and an area in a chromaticity diagram or color space;
    determine the custom PSD by maximizing, subject to the constraint value, the evaluation function; and
    adjust an output the plurality of the light sources based on the custom PSD.

22. The system of claim 21, wherein the constraint value is at least one selected from a group consisting of correlated color temperature (CCT), distance from Planckian locus ($D_{uv}$), and color rendering index (Ra).

* * * * *